United States Patent [19]
Chen et al.

[11] Patent Number: 5,951,880
[45] Date of Patent: Sep. 14, 1999

[54] METHOD FOR MAKING BUMP DISKS

[75] Inventors: Chun-Jen Chen, Chung-Li; Ming-Hung Su, Yong-Her; Joseph C-C Hung, Kaohsiung; James Hsi-Tang Lee, Hsinchu, all of Taiwan

[73] Assignee: Trace Storage Tech. Corp., Hsinchu, Taiwan

[21] Appl. No.: 08/877,100

[22] Filed: May 26, 1997

[51] Int. Cl.[6] ............................................. B44C 1/22
[52] U.S. Cl. ........................ 216/22; 216/102; 216/100; 216/95
[58] Field of Search ............................ 216/22, 88, 95, 216/100, 102

[56] References Cited

U.S. PATENT DOCUMENTS

| | | | |
|---|---|---|---|
| 3,593,331 | 7/1971 | Connell et al. | 340/174.1 |
| 5,675,462 | 10/1997 | Ayabe | 360/135 |
| 5,689,057 | 11/1997 | Baumgart et al. | 73/1 J |
| 5,741,560 | 4/1998 | Ross | 427/555 |

FOREIGN PATENT DOCUMENTS

| | | |
|---|---|---|
| 63-119038 | 5/1988 | Japan . |
| 4-146539 | 5/1992 | Japan . |
| 6-124433 | 5/1994 | Japan . |
| 8-096542 | 4/1996 | Japan . |

OTHER PUBLICATIONS

"Effect of Al Micro–Bumps on the Magnetic Properties and Morphology of CoCrTa/Cr/Al Thin Films"; Chang et al.; IEEE Trans. Magn., 31(6, Pt. 1); pp. 2731–2733, (1995).

*Primary Examiner*—Benjamin Utech
*Assistant Examiner*—George Goudreau
*Attorney, Agent, or Firm*—W. Wayne Liauh

[57] ABSTRACT

A wet etching method for making calibration bump disks for use in providing quality control of production run magnetic hard disks is disclosed. It includes the steps of: (a) coating a layer of bump material on a substrate; (b) coating a photoresist layer on the layer of bump material; (c) exposing the photoresist layer to a light source under a photomask; (d) developing the photoresist layer using a developer solution to form an undeveloped photoresist layer; (e) etching the substrate containing the layer of bump material and the undeveloped photoresist layer to remove portions of the layer of bump material not covered by the undeveloped photoresist layer; and (f) stripping the undeveloped photoresist layer to leave at least a bump on the substrate which was originally covered by the undeveloped photoresist layer. The wet etching method eliminates many of the problems observed from the conventional metal mask method, including the elimination of the convex-shaped bump surface.

9 Claims, 7 Drawing Sheets

METHOD FOR MAKING BUMP DISKS

FIELD OF THE INVENTION

The present invention relates to a method for making bump disks for calibrating a hard disk testing slider. More specifically, the present invention relates to a method for creating one or more bumps of precise dimensions on a calibration disk, or a "bump disk", which can be subsequently used for quantitatively calibrating a hard disk testing slider. A well-calibrated hard disk testing slider is a very important tool during the production run of magnetic disks; it ensures that the glide height of the magnetic disks meets the design standard.

BACKGROUND OF THE INVENTION

When magnetic recording disks are rotated in a disk drive, the magnetic head on a slider is caused to ride, or glide, on a cushion of air, which is commonly referred to as an air bearing, at a predetermined height slightly above the surface of the disk. As the density of hard disks continues to increase, the height of the air bearing, or the so-called "glide height", is forced to become lower and lower. This creates problems for air flow. As a result, most of the hard disks are "textured" on the surfaces thereof, so as to improve the flow of air current.

Texturing the disk surface, which creates bumps on the disk surface, however, generates another type of problem. If the heights of some of the bumps, or peaks, are greater than the glide height of the hard disk slider, the magnetic head may be inevitably damaged. Thus, after a production run, the magnetic disks must be tested of their glide height, which is defined as the minimum permissible glide height of the hard disk slider or the maximum height of the bumps, so as to ensure that they will not cause damages to the hard disk slider. Asperities that are high enough to impact the magnetic head slider during disk operation can cause failure of the drive. Thus, production run disks with asperities above a predetermined height must be identified and discarded.

Typically, as part of the hard disk fabrication process, production run magnetic disks are tested using a calibrated slider for their asperities. The calibrated slider rides on an air bearing at substantially the same distance from the disk surface as would the magnetic head slider in the disk drive. Typically, the calibrated slider can bend and move like a rigid body as a result of impacts with the asperities. When an asperity on the production run disk exceeds a predetermined tolerance, the calibrated slider will detect and indicate the asperity on the test result, signaling the production personnel to discard that particular disk. An improperly calibrated test slider may fail to detect many unsatisfactory production run disks, or, equally unacceptable, it may reject too many production run disks that actually provide acceptable quality.

Several methods have been developed in the past to make calibration disks, or bump disks, for the calibration of a test slider. Typically, these methods involve generating bumps on a calibration disk which emulate the undesirable asperities of a production run disk. In U.S. Pat. No. 5,062,021, the content thereof is incorporated by reference, it is disclosed a method of making crater shaped bumps on a magnetic disk using a laser pulse. The diameter of these crater shaped bumps is 0.8 mils and the height of the peripheral ridge of the crater above the nominal surface of the disk is in the range of 0.5 to 0.8 microinches.

In U.S. Pat. No. 5,236,763, the content thereof is incorporated by reference, it is disclosed a method of making elliptical crater shaped bumps by impinging multiple pulses of a laser beam on a printing roller. The major and minor diameters of the elliptical crater shaped bumps are 82 $\mu$m and 60 $\mu$m, respectively.

In U.S. Pat. No. 5,528,922, the content thereof is incorporated by reference, it is disclosed a method of employing laser pulses to make bumps on a calibration disk which can be used for calibrating a piezoelectric transducer slider. Crater shaped bumps having a diameter in the range of 10 to 25 $\mu$m and a peripheral ridge with a height in the range of 75 to 120 nm are made by impinging two or more pulses of laser energy on the same location of a calibration disk.

The above inventions provide certain advantages; however, the method that has been prevalently used in the industry for making calibration bump disks involves the use of a metal mask technique. FIG. 1 shows an illustrative flowchart diagram of the key steps of the metal mask technique for making calibration bump disks. First, a substrate 9 is obtained. A metal mask 90 having an aperture 92 is provided covering the substrate 9, except the area covered by the aperture 92. The areal dimension of the aperture 92 determines the areal size of the final bump to be made. A metal layer 93 is then formed on the surface of the metal mask 90, typically by a sputter means. A portion of the metal layer 93 is also formed inside the aperture 92. After the metal mask 90 is removed, a bump 91 is revealed in the place corresponding to where the aperture 92 was. After rinsing, overcoating, lubricating, testing, etc, a bump disk is obtained.

In the past, the metal mask technique has provided very good results for making precision bump disks. However, as market demand on the density of hard disks takes constant quantum jumps, the metal mask technique has become somewhat inadequate. As the density of hard disks increases, the glide height of the magnetic head slider becomes lower and lower. In the conventional metal mask technique, the depth of the aperture is typically 50 $\mu$m (i.e., the thickness of the metal mask), with a diameter of about 120 nm. Present day hard disk test runs require a calibration disk with bump height of 0.0457 $\mu$m. Due to the large difference (more than 1,000-fold) between the depth of the aperture (50 $\mu$m) and the intended height of the standard bump (0.0457 $\mu$m), the region near the periphery of the aperture does not receive the same amount of sputtering ion during the sputtering step. As a result, the bump so formed does not have a flat top as intended. Rather, the calibration bump would show a convex, non-flat, shape at least near its periphery. In other words, the calibration bump does not have a uniform height. As the intended height of the calibration bump becomes smaller, the inadequacy of the conventional metal mask technique becomes more profound. Similar problems are encountered when the intended diameter of the calibration bumps has to be reduced.

SUMMARY OF THE INVENTION

The primary object of the present invention is to develop an improved method for making calibration bump disks. More specifically, the primary object of the present invention is to develop an improved method for making calibration bumps disks which eliminates, or at least minimizes, the inadequacy of the conventional metal mask method. The bump disks developed in the present invention are particularly advantageous for calibrating a test slider, which is to be used in providing quality control during the production runs of very-high-density magnetic disks, which involve very low glide height.

The present invention employs a novel wet etching method for making precision bumps on a calibration disk, or bump disk. Unexpected results were realized in that the bumps so formed exhibited excellent conformance to the designed dimension, as shown from OM pictures and from three-dimensional Tencor plots. In the first step of the process disclosed in the present invention, a substrate, typically an aluminum substrate or NiP substrate, is obtained. This step is similar to the conventional metal mask method.

After cleaning and drying, a layer of bump material, preferably titanium nitride (TiN), is sputtered on the substrate. The bump layer is formed to have a thickness corresponding to the intended height of the calibration bump to be eventually formed. Other bump material such as Cr, Ta, Ti, etc, may be used. A photoresist layer is then coated on top of the bump material. The photoresist layer is exposed to a light source under a photomask, followed by appropriate development. Positive or negative photoresist can be used in the present invention. However, a positive photoresist is preferrred. The photomask is constructed such that the remaining (i.e., undeveloped) photoresist will have a diameter corresponding to the diameter of the calibration bump to be formed. The substrate, containing the bump layer and the remaining photoresist layer, is then subject to a wet etching process to remove the bump layer unprotected by the photoresist layer. Finally, the photoresist layer is stripped from the bump layer and a bump with a flat top and the intended height and diameter, is formed.

A variety of etching solutions can be used in the present invention. In one of the preferred embodiments of the present invention, a mixture solution containing ammonia hydroxide and hydrogen peroxide, was used. After the bump material is selected, the (positive) photoresist should be selected such that its exposed regions can be developed without affecting the bump material, and, on the other hand, the unexposed regions have a chemical resistance (relative to the etching solution) greater than the bump material. The latter requirement allows the bump material covered by the unexposed photoresist to be protected and remain intact during the wet etching process, so as to form the calibration bump having precisely the intended height and diameter as intended in the present invention.

BRIEF DESCRIPTION OF THE DRAWING

The present invention will be described in detail with reference to the drawing showing the preferred embodiment of the present invention, wherein.

DETAILED DESCRIPTION OF THE PREFERRED EMBODIMENT

The present invention discloses a wet etching method for making calibration bump disks which eliminates, or at least minimizes, many of the inadequacies that have observed with the conventional metal mask method, such as the convex-shaped top surfaces near the periphery of the bump. The bump disks developed in the present invention are particularly advantageous for calibrating a test slider for use in the quality control during the production runs of very-high-density magnetic disks, which require very low glide height.

Figure 1:
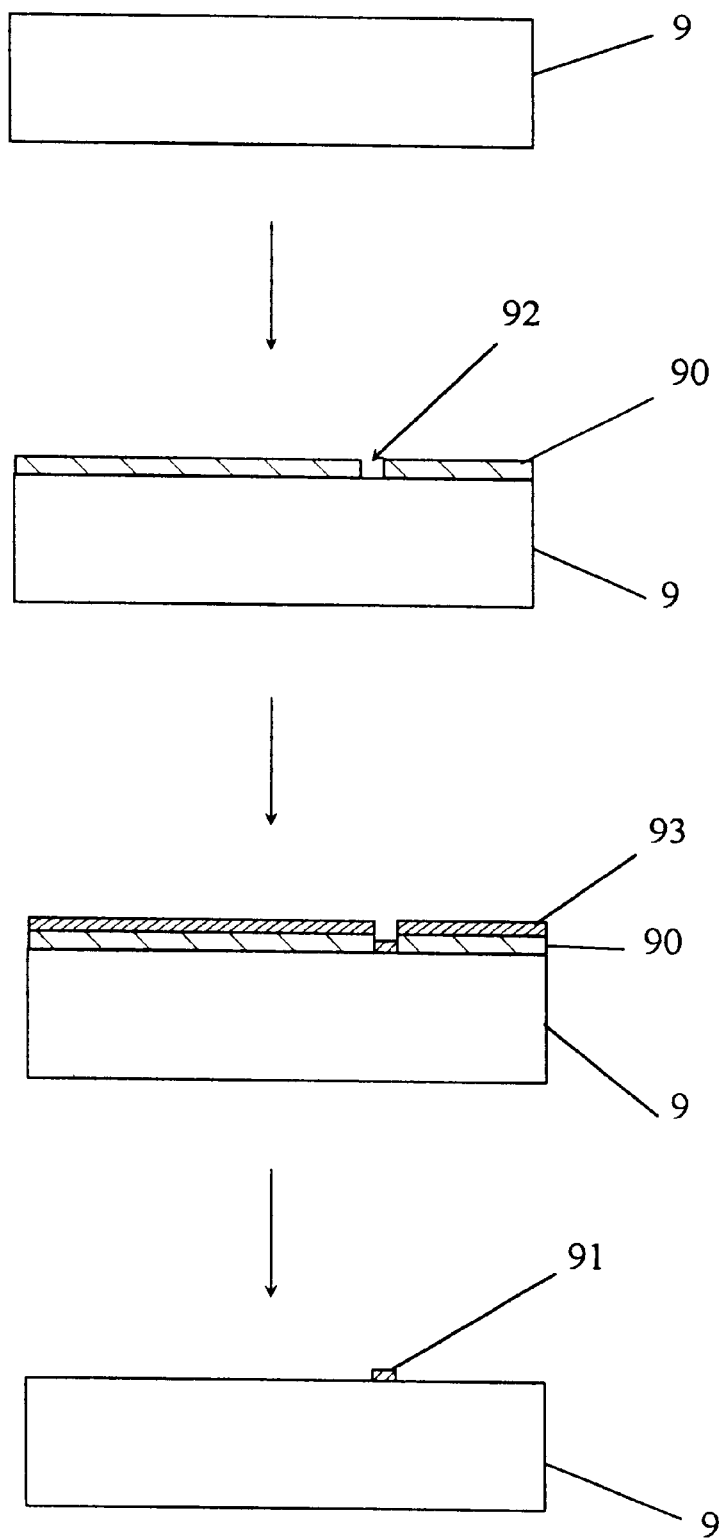
FIG. 1 is an illustrative flowchart diagram of the prior art metal mask process for making calibration bump disks.

Now refer to the drawings. FIG. 1 shows an illustrative flowchart diagram of the key steps of the prior art metal mask technique for making calibration bump disks. First, a substrate 9 is obtained. A metal mask 90 having an aperture 92 is provided to cover the substrate 9. The diameter of the aperture 92 determines the diameter of the calibration bump to be made. A metal layer 93 is then sputtered on the surface of the metal mask 90. A portion of the metal layer 93 is also sputtered inside the aperture 92 which eventually forms the bump. After the metal mask 90 is removed, a bump 91 is revealed in the place corresponding to the location of the aperture 92. After rinsing, overcoating, lubricating, testing, etc, a bump disk is obtained.

As discussed earlier, due to the large disparity between the depth of the aperture (50 $\mu$m) and the typical intended height of the standard bump (0.0457 $\mu$m), the region near the periphery of the aperture does not receive the same amount of sputtering ion during the sputtering step. As a result, the bump so formed does not have a flat top as intended. Rather, the calibration bump would show a convex, non-flat, shape at least near its periphery. As the intended height of the calibration bump becomes smaller, the inadequacy of the conventional metal mask technique becomes more evident. Similar problems are encountered when the intended diameter of the calibration bumps is reduced.

Figure 2:
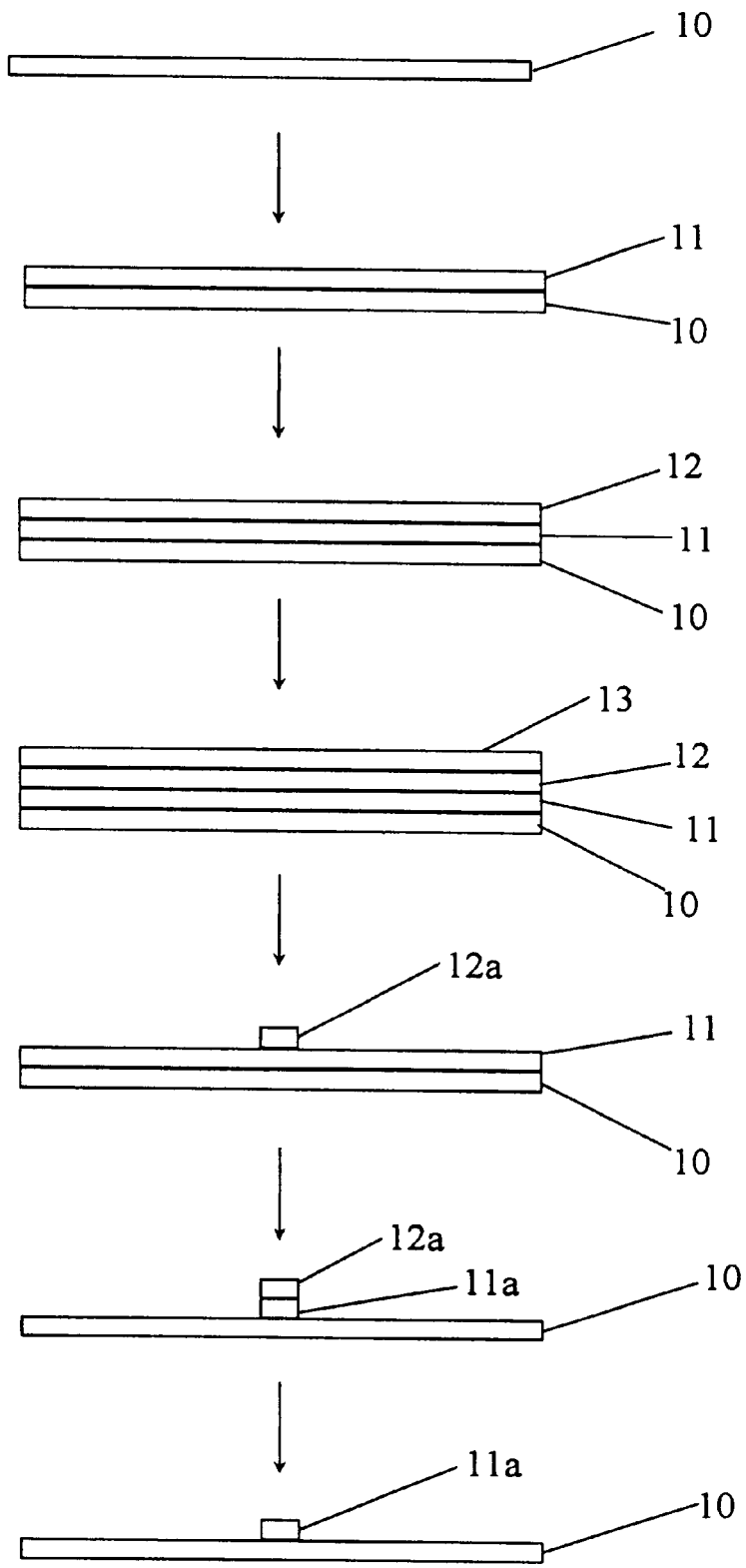
FIG. 2 is an illustrative flowchart diagram of the wet etching process for making calibration bump disks as disclosed in the present invention.

FIG. 2 shows an illustrative flowchart diagram of a preferred embodiment of the wet etching process for making calibration bump disks as disclosed in the present invention. In the first step, a substrate 10, typically an aluminum substrate or NiP substrate, is obtained. After cleaning and drying, a layer of bump material 11, preferably titanium nitride (TiN), is sputter-deposited on the substrate 10. The bump layer 11 is formed to have a thickness corresponding to the intended height of the calibration bump to be eventually formed. Other bump material such as Cr, Ta, Ti, etc, may be used. After the deposition of the bump layer 11, a positive photoresist layer 12 is then coated on top of the bump material 11. The photoresist layer 12 is exposed to a light source under a photomask 13, followed by appropriate development. The photomask 13 is constructed such that the remaining (i.e., undeveloped) photoresist will have a diameter corresponding to the diameter of the calibration bump to be formed.

After the development step, the substrate, containing the bump layer and the remaining photoresist layer 12a, is then subject to a wet etching process to remove the bump layer unprotected by the photoresist layer. Preferably, the etching solution is a mixture solution containing ammonia hydroxide and hydrogen peroxide. The bump layer that remained after the etching process is shown as 11a. The remaining photoresist layer 12a can be exposed to a light source again under a flood exposure so as allow it to be removed by a developer solution. After chemically stripping the photoresist layer, a titanium nitride bump 11a with a flat top and the intended height and diameter, is formed.

The present invention will now be described more specifically with reference to the following examples. It is to be noted that the following descriptions of examples, including the preferred embodiment of this invention, are presented herein for purposes of illustration and description, and are not intended to be exhaustive or to limit the invention to the precise form disclosed.

EXAMPLE 1a

Figure 3A:
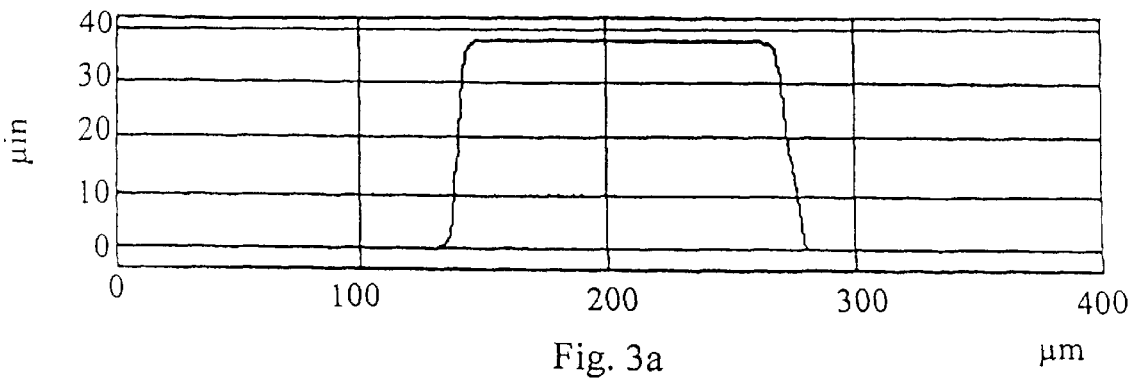
FIG. 3a is the Tencor profile of the titanium nitride layer prepared in Example 1 with the photoresist on top thereof after development.
Figure 3B:
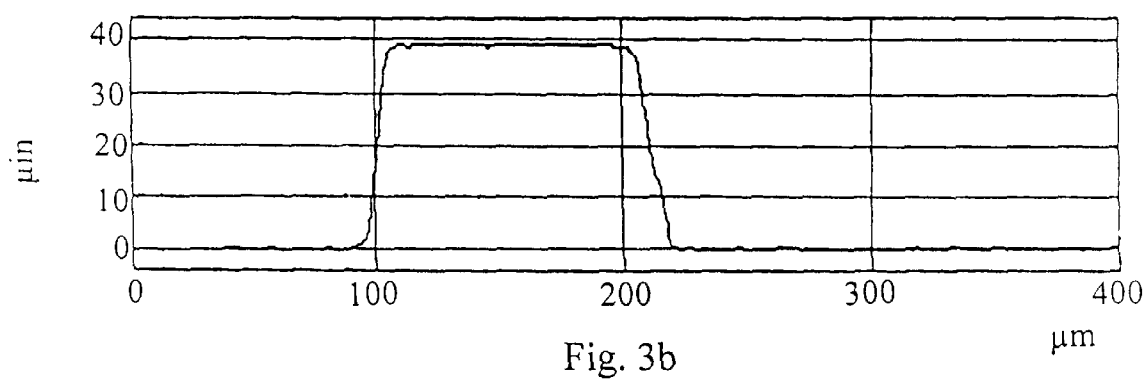
FIG. 3b is the Tencor profile of the titanium nitride layer prepared in Example 1 with the photoresist on top thereof after wet etching.

A layer of titanium nitride (TiN) of predetermined thickness was sputter-deposited on the an NiP substrate, after the substrate was cleaned and dried. Thereafter, a positive photoresist layer was then coated on top of the titanium nitride layer. The photoresist layer was then exposed to a light source under a photomask and subsequently developed using a developer solution (FHD-5). FIG. 3a is the Tencor profile of the titanium nitride layer prepared in Example 1a with the photoresist on top thereof after development. The photomask contained an open aperture of a predetermined diameter. After the development step, the substrate, which contained the titanium nitride layer and the remaining photoresist layer, was then subject to a wet etching process using a mixture solution of ammonium hydroxide, hydrogen peroxide, and deionized water at a volume ratio of 1:1:1, to remove the titanium nitride layer unprotected by the photoresist layer. FIG. 3b is the Tencor profile of the titanium nitride layer with the photoresist on top thereof after wet etching. Finally the remaining photoresist layer was chemically stripped using N-methyl-2-pyrroliddone. Alternatively, the remaining photoresist can be chemically stripped by first exposing it to a light source again under a flood exposure condition followed by subjecting it to a developer solution.

Figure 3C:
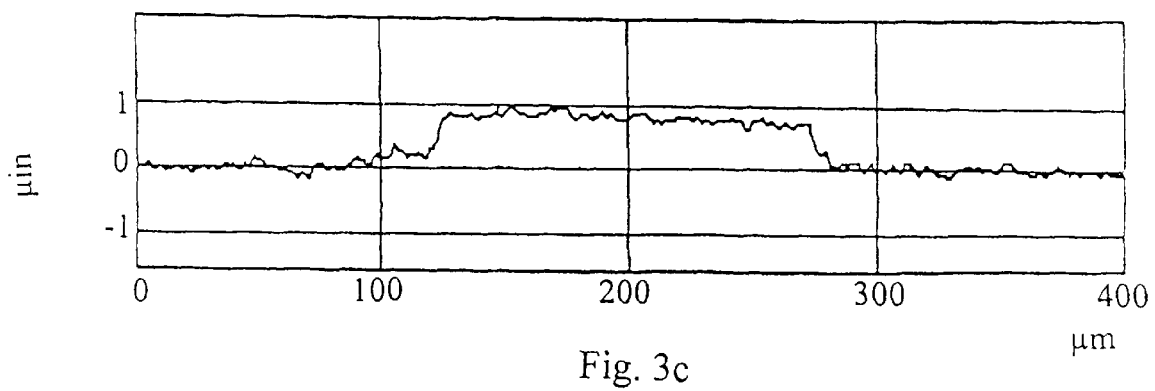
FIG. 3c is the Tencor profile of the titanium nitride bump prepared in Example 1 after the photoresist is chemically stripped (bump height: $0.878\mu''$).

After the chemical stripping step, the raw bump disk was subject to the steps of cleaning, sputter-overcoating, lubricating, and finally was polished to form the final bump disk. FIG. 3c is the Tencor profile (normalized height) of the titanium nitride bump after chemical stripping, showing a flat top surface with a uniform height of $0.878\mu"$ ($1\mu"$=500 Angstroms=0.5 $\mu$m). FIG. 3c also shows that the titanium nitride bump forms a essentially 90 degrees angle with the substrate surface. This is highly desirable.

EXAMPLE 1b–1g

The procedures in Examples 1b through 1g were identical to Example 1(a), except that different etching solutions were used. Table 1 summarizes the etching rate, measured in terms of seconds, as a function of the various compositions of the etching solution.

TABLE 1

| Example | $NH_4OH/H_2O_2/DI$ (vol. ratio) | etching time (seconds) |
|---|---|---|
| Example 1a | 1/1/1 | 100 |
| Example 1b | 0/1/0 | >1200 |
| Example 1c | 0.01/1/0 | 150 |
| Example 1d | 0.05/1/0 | 20 |
| Example 1e | 0.1/1/0 | 15 |
| Example 1f | 1/1/0 | 35 |
| Example 1g | 0.1/0.1/1 | 300 |

EXAMPLE 2

Figure 4:
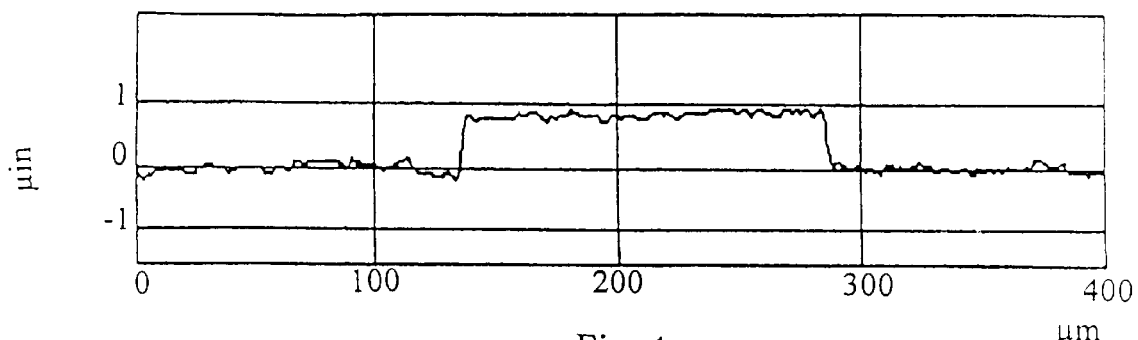
FIG. 4 is the Tencor profile of the titanium nitride bump prepared in Example 2 (bump height: $0.903\mu''$).

The procedure in Example 2 was identical to that in Example 1a, except that a different thickness of the titanium nitride layer was sputter deposited on the substrate. FIG. 4 is the Tencor profile of the titanium nitride bump after chemical stripping, showing a flat top with a uniform height of $0.903\mu"$.

EXAMPLE 3

Figure 5:
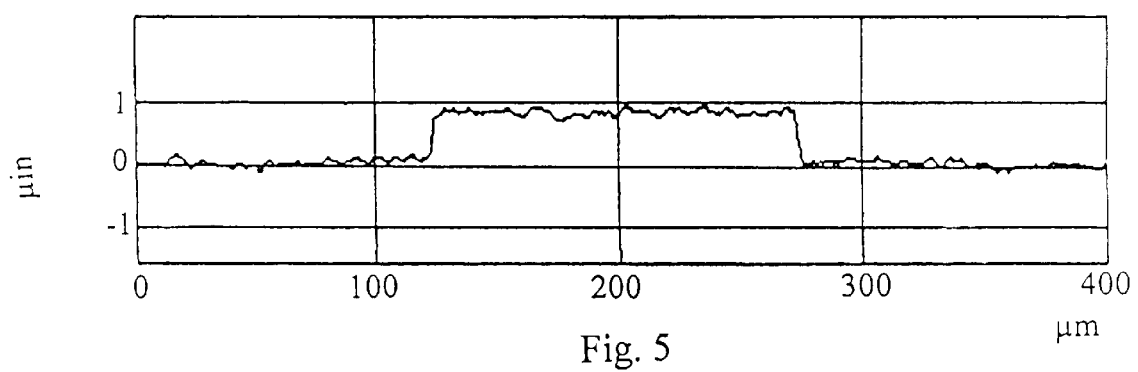
FIG. 5 is the Tencor profile of the titanium nitride bump prepared in Example 3 (bump height: $0.950\mu''$).

The procedure in Example 3 was identical to that in Example 1a, except that a different thickness of the titanium nitride layer was sputter deposited on the substrate. FIG. 5 is the Tencor profile of the titanium nitride bump after chemical stripping, showing a flat top with a uniform height of $0.950\mu"$.

EXAMPLE 4

Figure 6:
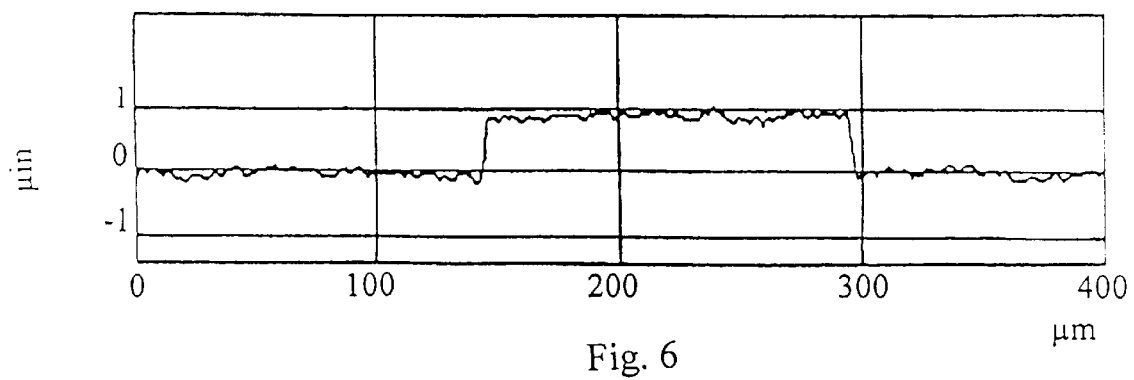
FIG. 6 is the Tencor profile of the titanium nitride bump prepared in Example 4 (bump height: $1.046\mu''$).
Figure 7:
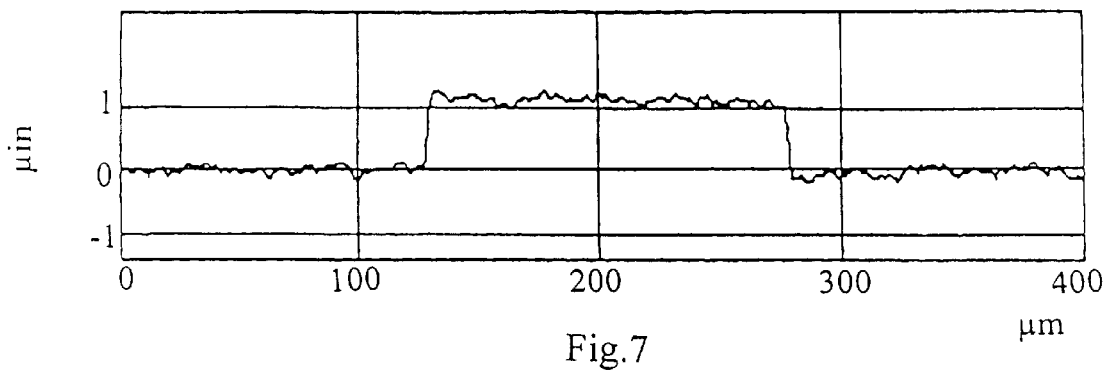
FIG. 7 is the Tencor profile of the titanium nitride bump prepared in Example 5 (bump height: $1.247\mu''$).
Figure 8A:
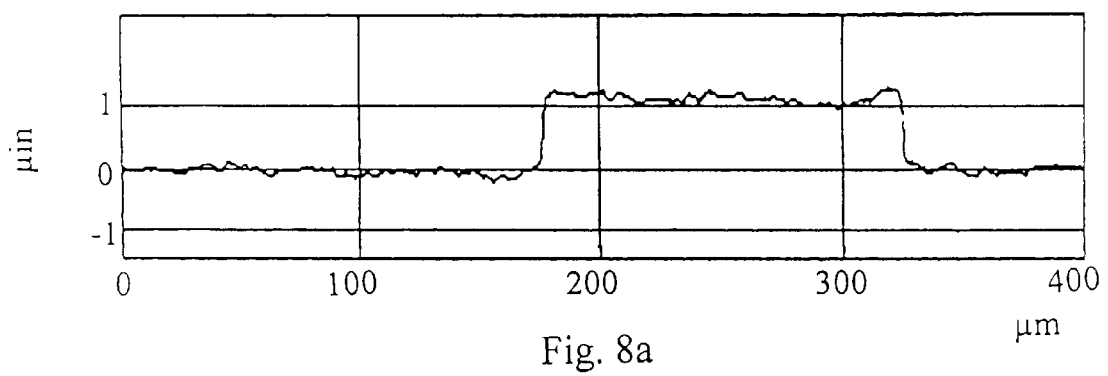
FIGS. 8a–8d are the Tencor profiles of the titanium nitride bumps in Examples 6a–6d, respectively (bump heights: 1.266, 1.419, 1.461, and $1.565\mu''$, respectively).
Figure 8B:
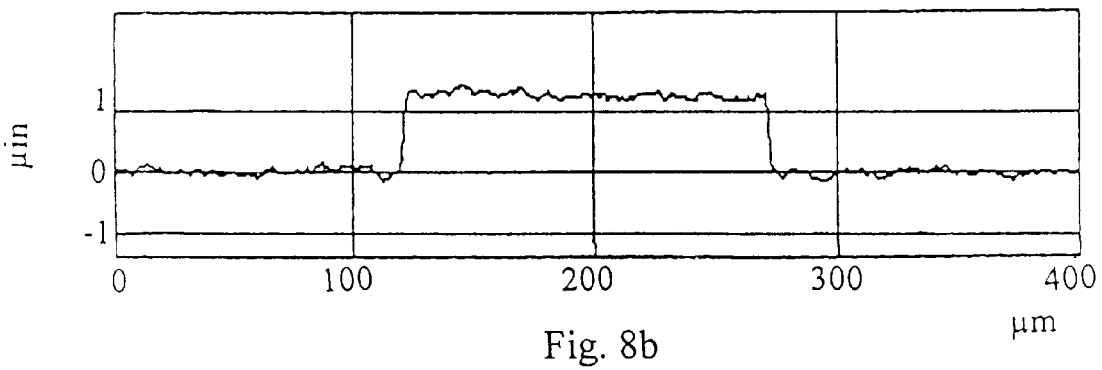
Figure 8C:
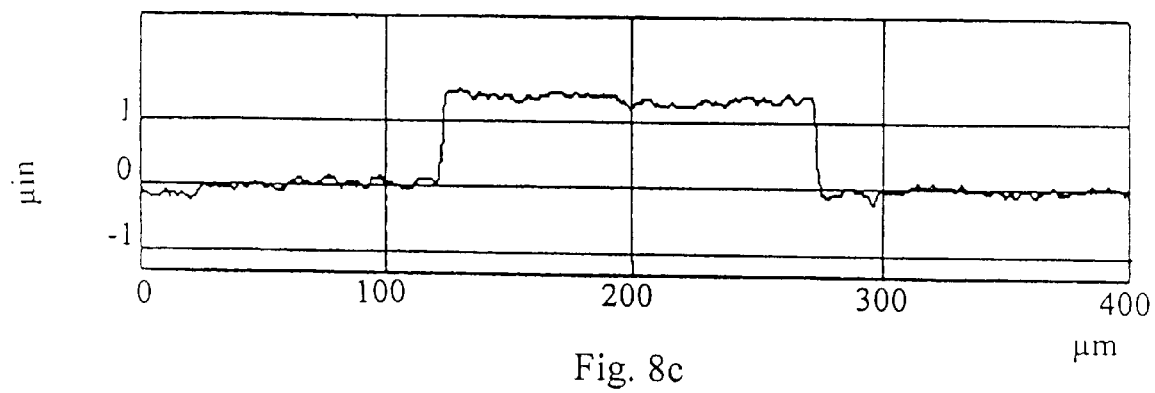
Figure 8D:
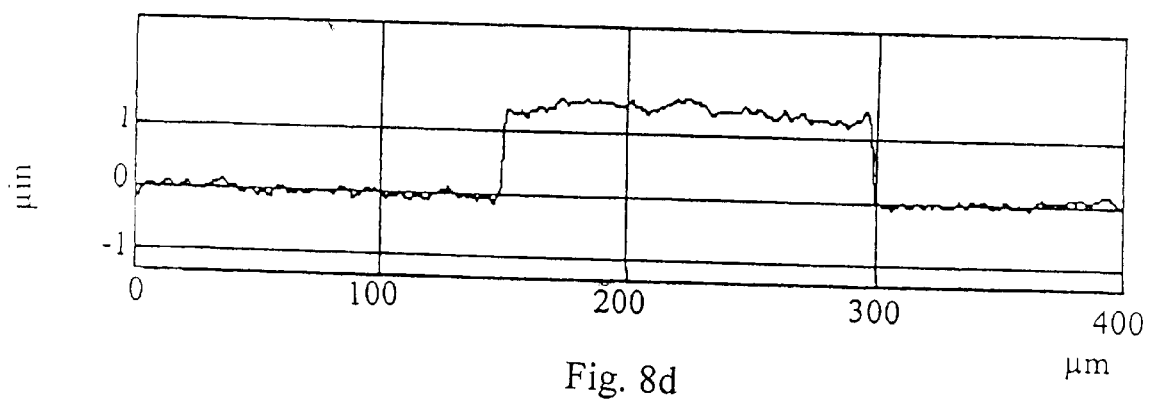

The procedure in Example 4 was identical to that in Example 1a, except that a different thickness of the titanium nitride layer was sputter deposited on the substrate. FIG. 6 is the Tencor profile of the titanium nitride bump after chemical stripping, showing a flat top with a uniform height of $1.046\mu"$.

EXAMPLE 5

The procedure in Example 6 was identical to that in Example 1a, except that a different thickness of the titanium nitride layer was sputter deposited on the substrate. FIG. 8 is the Tencor profile of the titanium nitride bump after chemical stripping, showing a flat top with a uniform height of $1.247\mu"$.

EXAMPLES 6a–6d

The procedure in Examples 6a–6d were identical to that in Example 1a, except that different thicknesses of the titanium nitride layerer were sputter deposited on the substrate. FIGS. 8a–8d are the Tencor profile of the titanium nitride bumps after chemical stripping, all showing flat tops with uniform heights of 1.266, 1.419, 1.461, and $1.565\mu"$, respectively. FIGS. 8a–8d indicate that excellent results can also be obtain from the process disclosed in the present invention for relatively large bump heights.

COMPARATIVE EXAMPLE 1

Figure 9:
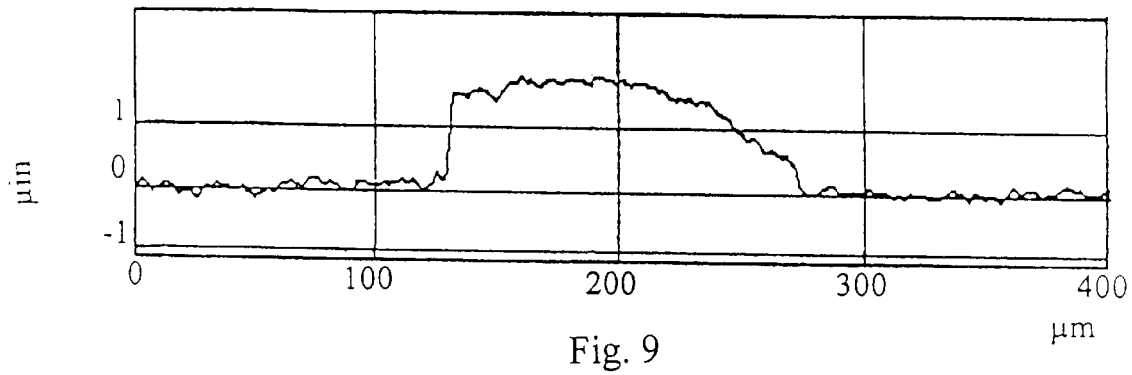
FIG. 9 is the Tencor profile of the metal bump prepared in Comparative Example 1.

A bump disk was made using the conventional metal mask technique. FIG. 9 is the Tencor profile of the metal bump, showing a convex-shaped top at one end of the bump.

COMPARATIVE EXAMPLE 2

The procedure in Comparative Example 2 was identical to that in Comparative Example 1, except that the metal mask had a greater thickness, thus its bump had a greater height.

Figure 10:
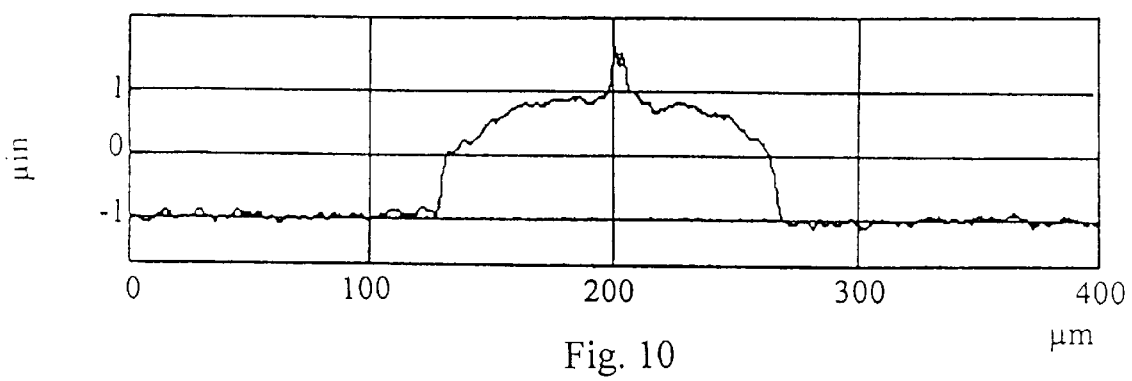
FIG. 10 is the Tencor profile of the metal bump prepared in Comparative Example 2.

FIG. 10, which shows the Tencor profile of the resultant metal bump, indicates that while the convexness is somewhat ameliorated with the increased glide height, its top surface still shows the undesired unevenness.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A method for making bump disks comprising the steps of:

(a) coating a layer of bump material on a substrate;

(b) coating a photoresist layer on said layer of bump material;

(c) exposing said photoresist layer to a light source under a photomask, wherein said photomask contains an opening corresponding to the dimension of a bump to be formed on said substrate;

(d) developing said photoresist layer using a developer solution to form an undeveloped photoresist layer;

(e) etching said substrate containing said layer of bump material and said undeveloped photoresist layer to remove portions of said layer of bump material not covered by said undeveloped photoresist layer; and (f) stripping said undeveloped photoresist layer to leave at least a bump on said substrate in an area that was originally covered by said undeveloped photoresist layer;

(g) wherein said bump material is selected from the group consisting of titanium nitride (TiN) Cr, Ta, and Ti.

2. The method for making bump disks according to claim 1 wherein said bump material is TiN.

3. The method for making bump disks according to claim 1 wherein said substrate is an aluminum substrate or an NiP substrate.

4. The method for making bump disks according to claim 1 wherein said photoresist is a positive photoresist.

5. The method for making bump disks according to claim 1 wherein said substrate containing said layer of bump material and said undeveloped photoresist layer is etched in step (e) using a mixture solution containing ammonium hydroxide and hydrogen peroxide.

6. The method for making bump disks according to claim 5 wherein the ammonium hydroxide and hydrogen peroxide are provided in a ratio ranging from about 0.05:1 to 1:1.

7. The method for making bump disks according to claim 1 wherein said undeveloped photoresist layer is chemically stripped in step (f) using N-methyl-2-pyrrolidone.

8. The method for making bump disks according to claim 1 wherein said bump has a bump height less than $2\mu''$, or 500 Å.

9. The method for making bump disks according to claim 1 which further includes the steps of cleaning, sputter overcoating, lubricating, and polishing, after said stripping step.

* * * * *